(12) United States Patent
Ferenc et al.

(10) Patent No.: US 9,242,586 B2
(45) Date of Patent: Jan. 26, 2016

(54) SEAT RISER

(71) Applicant: Brose Fahrzeugteile GmbH & Co. Kommanditgesellschaft, Coburg, Coburg (DE)

(72) Inventors: Anthony Ferenc, Goodrich, MI (US); Leo Ioppolo, Washington, MI (US); Larry Demeniuk, Sterling Heights, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 8 days.

(21) Appl. No.: 14/251,456

(22) Filed: Apr. 11, 2014

(65) Prior Publication Data

US 2015/0291067 A1    Oct. 15, 2015

(51) Int. Cl.
| | |
|---|---|
| B60N 2/44 | (2006.01) |
| F16M 13/00 | (2006.01) |
| B60N 2/50 | (2006.01) |
| B60N 2/07 | (2006.01) |

(52) U.S. Cl.
CPC .. *B60N 2/44* (2013.01); *B60N 2/07* (2013.01); *B60N 2/50* (2013.01)

(58) Field of Classification Search
CPC .............. B60N 2/07; B60N 2/44; B60N 2/50; B60N 2/0705; B60N 2/682
See application file for complete search history.

(56) References Cited

U.S. PATENT DOCUMENTS

| | | | | | |
|---|---|---|---|---|---|
| 5,472,165 | A | * | 12/1995 | Gruber ................... | B60N 2/045 248/424 |
| 5,997,069 | A | * | 12/1999 | Coffey ............... | B60N 2/01591 296/65.01 |
| 6,019,412 | A | * | 2/2000 | Liu ....................... | B60N 2/0705 296/65.13 |
| 8,807,508 | B2 | * | 8/2014 | Ferenc ................... | B60N 2/682 248/249 |
| 2004/0232303 | A1 | | 11/2004 | Rausch et al. | |
| 2013/0026328 | A1 | | 1/2013 | Ferenc et al. | |

* cited by examiner

*Primary Examiner* — Jeanette E Chapman
(74) *Attorney, Agent, or Firm* — Christie, Parker & Hale, LLP

(57) ABSTRACT

The invention relates to a seat riser for spacing a guide rail (5) of a motor vehicle seat from a vehicle floor, the guide rail (5) extending along a direction (x) of longitudinal extension and the seat riser (1) comprising a fastening portion (2) being formed to fasten the seat riser (1) to the vehicle floor and a welding portion (4) including at least a first and a second welding point (41, 42) and being formed to fasten the guide rail (5) to the seat riser (1) at the welding points (41, 42), wherein the two welding points (41, 42) are spaced from each other in a direction (y) perpendicular to the direction of longitudinal extension of the guide rail such (5) that they are associated with opposite first and second longitudinal sides (51, 52) of the guide rail (5), respectively, when the guide rail is fastened to the seat riser, and wherein the welding portion (4) is provided with a cutout (45) extending from the first longitudinal side (51) of the guide rail (5) towards the second longitudinal side (52) of the guide rail (5), when the guide rail is fastened to the seat riser, the cutout (45) being located adjacent to the second welding point (42) associated with the second longitudinal side (52) of the guide rail (5) such that the second welding point (42) is accessible for a laser beam from the first longitudinal side (51) of the guide rail (5) during a welding process.

20 Claims, 2 Drawing Sheets

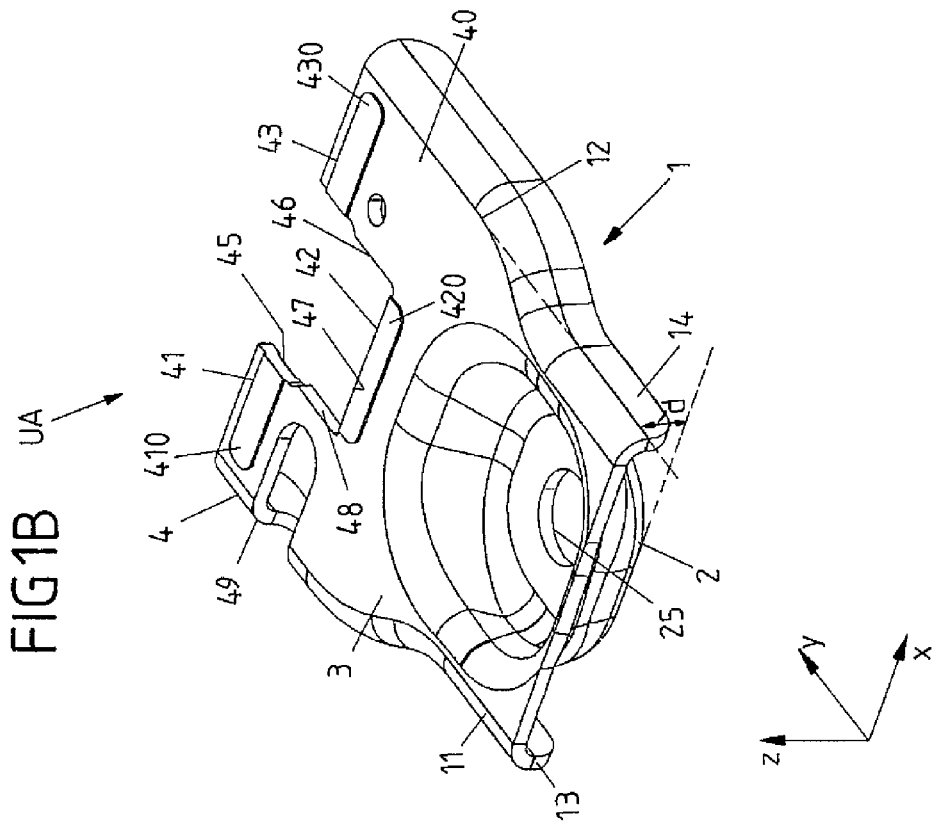
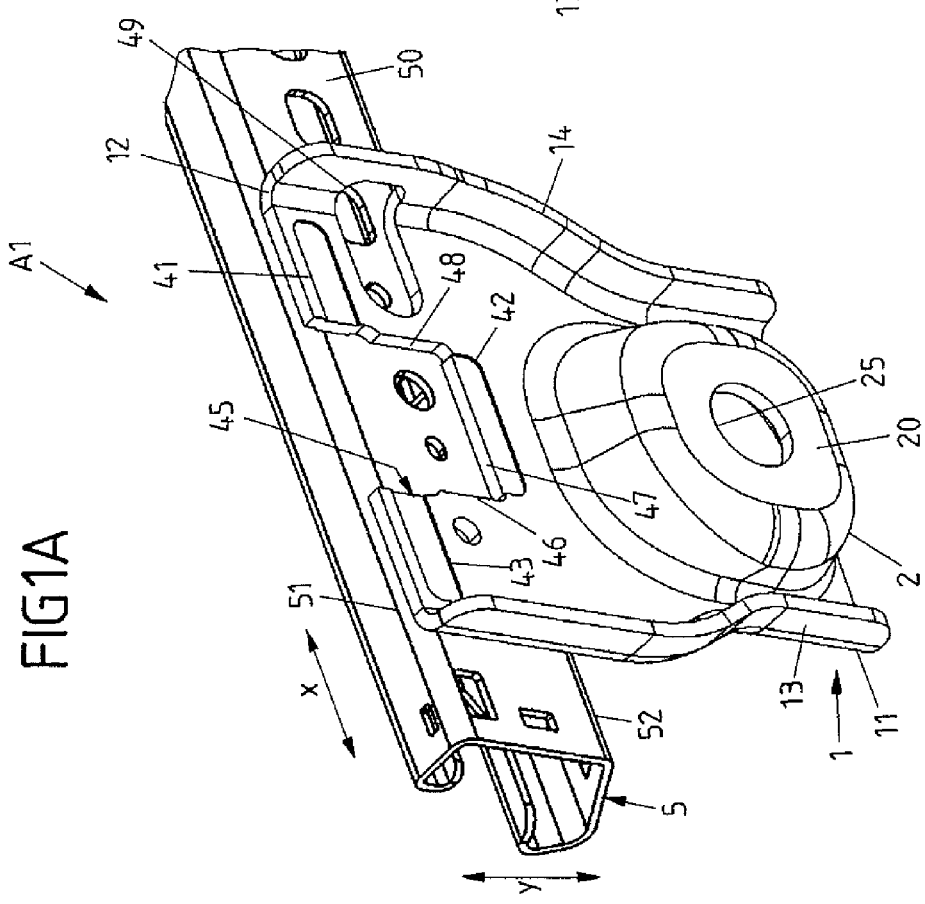

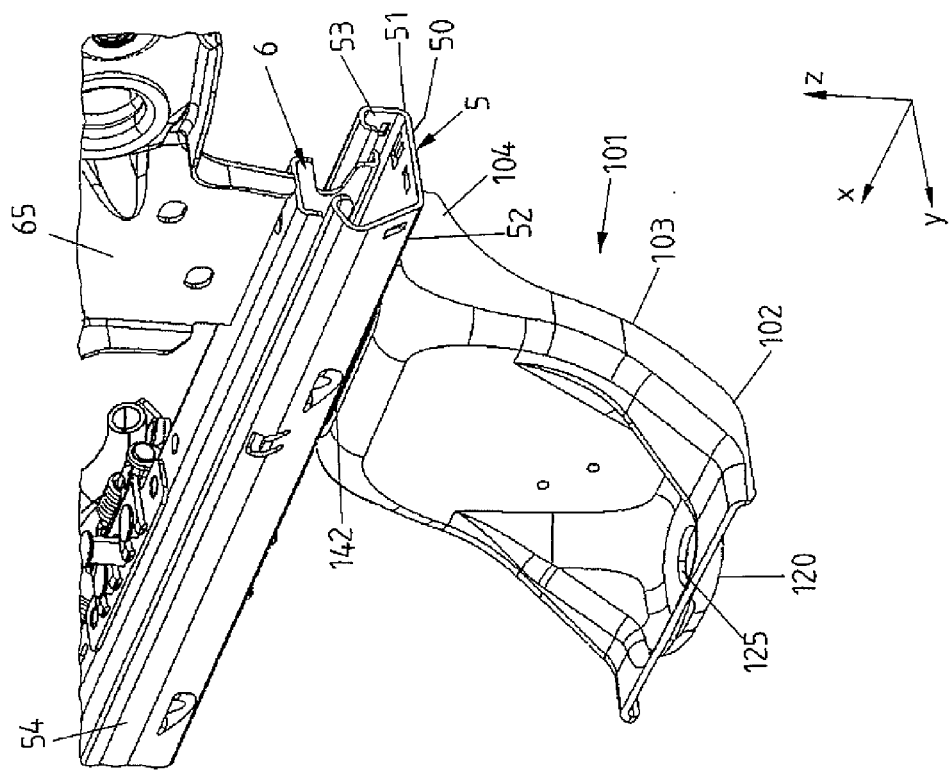
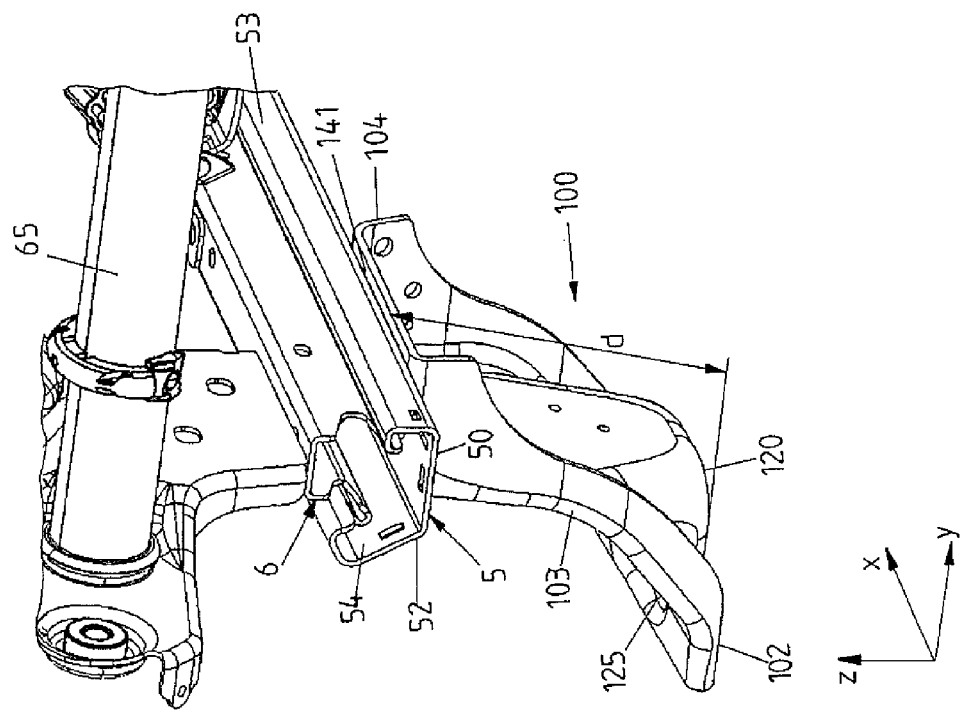

SEAT RISER

The present invention relates to a seat riser for spacing a guide rail of a motor vehicle seat from a vehicle floor.

By such seat riser a guide rail provided for adjusting the position of a motor vehicle seat along a longitudinal direction can be spaced from a vehicle floor and at the same time fixed to the vehicle floor. This provides additional space for electrical or mechanical attachments and improves the foot clearance of rear seat occupants. Seat risers may also be employed for releasably attaching a motor vehicle seat to the vehicle floor. By releasing the connection of the seat riser with the vehicle floor, the seat can be completely removed together with the guide rail in order to provide additional storage space inside the vehicle. In addition, the raised position of a vehicle seat enlarges the field of view of a vehicle occupant sitting on the vehicle seat.

A known seat riser 101 for spacing a guide rail 5 of a motor vehicle seat from a vehicle floor is shown in FIGS. 2A and 2B.

Here, the guide rail 5 extends along a longitudinal direction x (e.g., the vehicle longitudinal axis) and is in slidable engagement with a seat rail 6 carrying the seat structure 65 of a motor vehicle seat for longitudinal adjustment of that seat.

The guide rail 5 which is to be fixed to a vehicle floor via the seat riser 101 has two longitudinal sides 51, 52 in the form of curved edges extending along the direction of extension x of the guide rail 5 and being spaced from each other along a direction y perpendicular to the longitudinal direction x. A longitudinally extending base 50 of the guide rail 5 is delimited by the two longitudinal sides 51, 52, with a sidewall 53, 54 of the guide rail 5 extending vertically from the base 50 at each of the longitudinal sides 51, 52, respectively.

The seat riser 101 comprises a fastening portion 102 having a fastening surface 120 for fitting the seat riser 101 (and thus the guide rail 5) to a vehicle floor and at least one fastening point 125 (formed by a through hole in the fastening surface 120) for (releasably) attaching the seat riser 101 to the vehicle floor by suitable fastening means, such as a screw.

Furthermore, the seat riser 101 comprises a welding portion 104 defining a welding surface 140 for fitting the welding portion 104 to the guide rail 5, and more particularly, to the base 50 of the guide rail 5. The guide rail 5 is connected to the welding portion 104 of the seat riser 101 by two welding seams 141 and 142 each of which is provided at one of the longitudinal sides 51, 52 of the guide rail 5, thereby connecting the guide rail 5 to the welding surface 140 of welding portion 104 at its longitudinal sides 51, 52.

As a result, the guide rail 5 is spaced from the vehicle floor by a distance d defined by the vertical distance between the fastening surface 120 of fastening portion 102 and the welding surface 140 of welding portion 104, the welding portion 104 and the fastening portion 102 of the seat riser 101 being connected by a connecting portion 103.

In order to connect a guide rail 5 to the welding portion 104 of a seat riser 101 as shown in FIGS. 2A and 2B, two welding seams 141 and 142 have to be produced wherein the first welding seam 141 is created by a laser positioned opposite to the first longitudinal side 51 of guide rail 5 and the second welding seam 142 is created by a laser positioned opposite to the second longitudinal side 52 of guide rail 5.

Typically, two pairs of a guide rail 5 and a seat rail 6 are associated with one vehicle seat and each pair of rails 5, 6 is connected to the vehicle floor by at least two seat risers 101 being located at the respective end portions of the guide rail 5.

It is an object of the invention to provide a seat riser which facilitates the process of connecting a guide rail to a seat riser by laser welding.

According to the invention, a seat riser for spacing a guide rail of a motor vehicle seat from a vehicle floor, wherein the guide rail extends along a direction of longitudinal extension, comprises a fastening portion being formed to fasten the seat riser to the vehicle floor, and a welding portion including at least a first and a second welding point and being formed to attach the guide rail to the seat riser at said welding points, wherein the two welding points are spaced from each other in a direction perpendicular to the direction of longitudinal extension of the guide rail such that they are associated with opposite first and second longitudinal sides of the guide rail, when the guide rail is properly fastened to the seat riser, and wherein the welding portion is provided with a cutout, the cutout extending from the first longitudinal side of the guide rail towards the second longitudinal side of the guide rail, when the guide rail is fastened to the seat riser, and the cutout being located adjacent to the second welding point associated with the second longitudinal side of the guide rail such that the second welding point is accessible for a laser beam from the first longitudinal side of the guide rail during a welding process.

This facilitates the process of connecting a guide rail to a seat riser at two welding points located at opposite longitudinal sides of the guide rail because both welding points are accessible for a laser beam from the first longitudinal side of the guide rail.

According to one aspect of the invention, the cutout in the welding portion of the seat riser is delimited at one side by the second welding point.

According to another aspect of the invention, the cutout opens up opposite to the second welding point.

According to yet another aspect of the invention, the first and second welding points are also spaced from each other along the direction of longitudinal extension of the guide rail.

According to yet another aspect of the invention, the welding portion of the seat riser includes a third welding point associated with the first longitudinal side of the guide rail and being spaced apart from the second welding point in a direction perpendicular to the direction of longitudinal extension of the guide rail.

Furthermore, the third welding point is also spaced apart from both, the first and second welding points, along the direction of longitudinal extension of the guide rail.

According to yet another aspect of the invention, the individual welding points each extend along the direction of longitudinal extension of the guide rail.

According to yet another aspect of the invention, a respective welding point is formed by an elevation of the welding portion of the seat riser. A respective elevation may be delimited by a planar welding surface, with the different welding surfaces extending in one and the same plane.

In particular, the invention may be applied to seat risers being configured such that the distance between the guide rail and a vehicle floor provided by the seat riser is substantially smaller than the extension of the welding portion along the direction of longitudinal extension of the guide rail.

In addition, the invention relates to a guide rail assembly comprising a guide rail which is attached to a seat riser configured according to any of the claims directed to the seat riser.

The invention will now be explained in further detail with reference to the Drawings. In the Drawings:

FIG. 1A shows a perspective view of a seat riser connected to a guide rail of a motor vehicle seat;

FIG. 1B shows another perspective view of the seat riser displayed in FIG. 1A;

FIG. 2A shows a known seat riser connected to a guide rail; and

FIG. 2B is another perspective view of the seat riser and the guide rail shown in FIG. 2A.

The combination of a seat riser 1 and a guide rail 5 shown in FIGS. 1A and 1B differs from the seat riser 101 and the guide rail 5 shown in FIGS. 2A and 2B in that 0 the seat riser 1 is provided with a cutout 45; ii) the welding points 41, 42 and 43 on the welding portion 4 of the seat riser 1 are elevated with respect to the welding surface 40; and iii) the vertical distance d between the fastening surface 20 of the seat riser 1 and the welding surface 40 of the seat riser 1 is smaller than in the case of FIGS. 2A and 2B. Apart from that, the seat riser 1 and the guide rail 5 of FIGS. 1A and 1B are essentially identical to those shown in FIGS. 2A and 2B. Therefore, reference is made to the description of FIGS. 2A and 2B with respect to further details of the seat riser 1 and the guide rail 5. In particular, the guide rail 5 shown in FIGS. 1A and 1B is completely identical to the guide rail 5 shown in FIGS. 2A and 2B.

The seat riser 1 shown in FIGS. 1A and 1B comprises a fastening portion 2 having a fastening surface 20 for fitting the seat riser 1 to a vehicle floor and at least one fastening point 25, e.g., in form of a through hole, for (releasably) attaching the seat riser 1 to the vehicle floor by suitable fastening means engaging the fastening point 25.

Furthermore, the seat riser 1 comprises a welding portion 4 for connecting the seat riser 1 to a guide rail 5 which is described in detail above with respect to FIGS. 2A and 2B.

The welding portion 4 and the fastening portion 2 of seat riser 1 are connected by a connecting portion 3. In the embodiment shown in FIGS. 1A and 1B, the vertical distance d (along the z-axis) between the welding surface 40 and the fastening surface 20 of seat riser 1 is much smaller than in FIGS. 2A and 2B. This is caused by the respective size and structure of the connecting portion 3. In addition, the seat riser 1 is stabilized by curved rims 13, 14 extending along each of the lateral edges 11, 12 of seat riser 1.

The welding portion 4 of seat riser 1 is connected to the guide rail 5 or, more specifically, to its base 50 at various welding points 41, 42, 43 (each of which extends along the direction of extension x of guide rail 5). Two welding points 41, 43, namely a first welding point 41 and a third welding point 43 which are spaced from each other along the direction of extension x of guide rail 5, are associated with the first longitudinal side 51 of guide rail 5 such that the welding portion 4 and the base 50 of guide rail 5 may be connected at these welding points 41, 43 by laser welding along the first longitudinal side 51 of guide rail 5.

Another (second) welding point 42 of welding portion 4 is associated with the second longitudinal side 52 of guide rail 5 and is located such that the base 50 of guide rail 5 may be connected to the welding portion 4 of the seat riser 1 along the second longitudinal edge 52 of guide rail 5. Thus, the second welding point 42 is spaced apart from the first and third welding points 41, 43 along a direction y perpendicular to the longitudinal direction x. At the same time, the second welding point 42 is located between the first and third welding points 41, 43 along the longitudinal direction x. This leads to a staggered configuration of the three welding points 41, 42, 43.

According to the embodiment shown in FIGS. 1A and 1B, each welding point 41, 42, 43 has a local planar welding surface 410, 420 and 430, respectively, which abuts against the base 50 of guide rail 5 when the guide rail 5 is properly arranged on the welding portion 4 of seat riser 1 in order to connect guide rail 5 and seat riser 1 by laser welding at the welding points 41, 42, 43.

Each local, planar welding surface 410, 420 and 430 is elevated with respect to the welding surface 40 such that there is a definite, planar contact between the welding points 41, 42, 43 and the base 50 of guide rail 5 at the local welding surfaces 410, 420 and 430 which extend in one and the same plane. The elevation of a respective planar welding surface 410, 420, 430 may amount to a fraction of a millimeter or a few millimeters, e.g. 0.5 mm. This elevation is preferably maintained during the welding process.

Furthermore, the welding portion 4 of seat riser 1 is provided with a cutout 45 extending from the first longitudinal edge 51 of guide rail 5 to its second longitudinal edge 52 when the guide rail 5 is properly fitted to the welding portion 4 of seat riser 1, as indicated in FIG. 1A. The cutout 45 is delimited by three sidewalls 46, 47, 48.

Here, one sidewall 47 of cutout 45 which is located opposite to the first longitudinal side 51 of guide rail 5 and extends along its second longitudinal side 52 is at least partially formed at the second welding point 42. Opposite to the second welding point 42, the cutout 45 opens up such that the second welding point 42 which is located at the second longitudinal side 52 of guide rail 5 is accessible by a laser beam from the first longitudinal side 51 of guide rail 5.

As a result, all welding points 41, 42, 43, two of which (41 and 43) are located at the first longitudinal side 51 of guide rail 5 and one of which (42) is located at the second longitudinal side 52 of guide rail 5, are accessible by a laser beam produced by a laser which is located in front of the first longitudinal side 51 of guide rail 5. This facilitates the process of connecting the guide rail 5 to the welding portion 4 of seat riser 1 because the welding seams at all welding points 41, 42, 43 can be produced by one laser being located in front of the first longitudinal side 51 of guide rail 5. This is of particular relevance in cases where the arrangement of a laser in front of the second longitudinal side 52 of guide rail 5 may lead to a collision with the seat riser 1 due to its structure.

The invention claimed is:

1. A seat riser for spacing a guide rail of a motor vehicle seat from a vehicle floor, the guide rail extending along a direction of longitudinal extension and the seat riser comprising a fastening portion being formed to fasten the seat riser to the vehicle floor and a welding portion including at least a first and a second welding point and being formed to fasten the guide rail to the seat riser at the welding points, wherein the welding points are spaced from each other in a direction perpendicular to the direction of longitudinal extension of the guide rail such that they are associated with opposite first and second longitudinal sides of the guide rail, respectively, when the guide rail is fastened to the seat riser, and wherein the welding portion is provided with a cutout extending from the first longitudinal side of the guide rail towards the second longitudinal side of the guide rail, when the guide rail is fastened to the seat riser, the cutout being located adjacent to the second welding point associated with the second longitudinal side of the guide rail such that the second welding point is accessible for a laser beam from the first longitudinal side of the guide rail during a welding process.

2. A seat riser according to claim 1, wherein the cutout is partially delimited by the second welding point.

3. A seat riser according to claim 1, wherein the cutout opens up opposite to the second welding point.

4. A seat riser according to claim 1, wherein the first and second welding points are spaced from each other along the direction of longitudinal extension of the guide rail.

5. A seat riser according to claim 1, wherein the welding portion includes a third welding point associated with the first longitudinal side of the guide rail and being spaced apart from the second welding point along a direction perpendicular to the direction of longitudinal extension of the guide rail.

6. A seat riser according to claim 5, wherein the third welding point is spaced apart from the first welding point along the direction of longitudinal extension of the guide rail.

7. A seat riser according to claim 6, wherein the second welding point is located between the first and third welding points along the direction of longitudinal extension of the guide rail.

8. A seat riser according to claim 1, wherein a respective welding point extends along the direction of longitudinal extension of the guide rail.

9. A seat riser according to claim 1, wherein a respective welding point is formed by an elevation of the welding portion of the seat riser.

10. A seat riser according to claim 9, wherein the respective elevation is delimited by a planar welding surface.

11. A seat riser according to claim 10, wherein the planar welding surfaces of the various welding points extend in one and the same plane.

12. A seat riser according to claim 1, wherein the vertical space between the guide rail and a vehicle floor provided by the seat riser is substantially smaller than the extension of the welding portion along the direction of longitudinal extension of the guide rail.

13. A vehicle seat assembly for a motor vehicle comprising,
a guide rail extending along a direction of longitudinal extension,
a seat riser for spacing the guide rail from a vehicle floor,
a fastening portion of the seat riser being formed to fasten the seat riser to the vehicle floor, and
a welding portion of the seat riser including at least a first and a second welding point, where the guide rail is fastened to the seat riser,
wherein the two welding points are spaced from each other in a direction perpendicular to the direction of longitudinal extension of the guide rail such that they are associated with opposite first and second longitudinal sides of the guide rail, respectively, and
wherein the welding portion is provided with a cutout extending from the first longitudinal side of the guide rail towards the second longitudinal side of the guide rail and being located adjacent to the second welding point associated with the second longitudinal side of the guide rail such that the second welding point is accessible for a laser beam from the first longitudinal side of the guide rail during a welding process.

14. A vehicle seat assembly according to claim 13, wherein the cutout is partially delimited by the second welding point.

15. A vehicle seat assembly according to claim 13, wherein the cutout opens up opposite to the second welding point.

16. A vehicle seat assembly according to claim 13, wherein the welding portion includes a third welding point associated with the first longitudinal side of the guide rail and being spaced apart from the second welding point along a direction perpendicular to the direction of longitudinal extension of the guide rail.

17. A vehicle seat assembly according to claim 16, wherein the third welding point is spaced apart from the first welding point along the direction of longitudinal extension of the guide rail.

18. A vehicle seat assembly according to claim 17, wherein the second welding point is located between the first and third welding points along the direction of longitudinal extension of the guide rail.

19. A vehicle seat assembly according to claim 13, wherein a respective welding point is formed by an elevation of the welding portion of the seat riser.

20. A vehicle seat assembly according to claim 19, wherein a respective elevation is delimited by a local planar welding surface.

* * * * *